(12) United States Patent
Ebner (10) Patent No.: US 9,863,606 B2
(45) Date of Patent: Jan. 9, 2018

(54) ARRANGEMENT FOR LIGHT OUTPUT COMPRISING AN LED LIGHT SOURCE AND A REFLECTOR

(71) Applicant: ZUMTOBEL LIGHTING GMBH, Dornbirn (AT)

(72) Inventor: Stephan Ebner, Dornbirn (AT)

(73) Assignee: ZUMTOBEL LIHTING GMBH, Dornbirn (AT)

( * ) Notice: Subject to any disclaimer, the term of this patent is extended or adjusted under 35 U.S.C. 154(b) by 0 days.

(21) Appl. No.: 14/786,894

(22) PCT Filed: Apr. 24, 2014

(86) PCT No.: PCT/EP2014/058363
§ 371 (c)(1),
(2) Date: Oct. 23, 2015

(87) PCT Pub. No.: WO2014/174022
PCT Pub. Date: Oct. 30, 2014

(65) Prior Publication Data
US 2016/0102844 A1 Apr. 14, 2016

(30) Foreign Application Priority Data

Apr. 26, 2013 (DE) .................... 20 2013 101 815 U (51) Int. Cl.
*F21V 13/02* (2006.01)
*F21V 7/00* (2006.01)
(Continued)

(52) U.S. Cl.
CPC ............... *F21V 13/02* (2013.01); *F21K 9/60* (2016.08); *F21V 7/0083* (2013.01); *F21V 13/04* (2013.01);
(Continued)

(58) Field of Classification Search
CPC ........ F21V 13/02; F21V 13/04; F21V 7/0083; F21K 9/60; F21Y 2105/10; F21Y 2115/10; F21Y 2101/00
See application file for complete search history.

(56) References Cited

U.S. PATENT DOCUMENTS 6,019,493 A * 2/2000 Kuo ........................ F21V 5/008
116/63 R
8,235,547 B2 8/2012 Hofmann
(Continued)

FOREIGN PATENT DOCUMENTS

AT WO 2012049006 A1 * 4/2012 ................ F21S 8/04
CN 201836765 5/2011
(Continued)

OTHER PUBLICATIONS

International Search Report for PCT/EP2014/058363, English translation attached to original, Both completed by the European Patent Office on Jul. 2, 2015, All together 7 Pages.

Primary Examiner — Mary Ellen Bowman
(74) Attorney, Agent, or Firm — Brooks Kushman P.C.

(57) ABSTRACT

An arrangement for light output having an LED light source for generating light and emitting the light in a main emission direction, a reflector for optically influencing the light, and an optical element for optically influencing the light, wherein the optical element is arranged to take effect between firstly the LED light source and secondly the reflector, is configured in a manner curving forward in the main emission direction, and in this case consists of a light-transmissive material.

12 Claims, 6 Drawing Sheets

(51) Int. Cl.
*F21V 13/04* (2006.01)
*F21K 9/60* (2016.01)
*F21Y 105/10* (2016.01)
*F21Y 115/10* (2016.01)

(52) U.S. Cl.
CPC ....... *F21Y 2105/10* (2016.08); *F21Y 2115/10* (2016.08)

(56) References Cited

U.S. PATENT DOCUMENTS

| | | | | |
|---|---|---|---|---|
| 8,556,471 | B2* | 10/2013 | Pahlke | F21K 9/00 362/245 |
| 9,103,530 | B2* | 8/2015 | Gassner | F21S 8/04 |
| 2009/0303711 | A1* | 12/2009 | Remus | F21S 8/06 362/234 |
| 2010/0226127 | A1* | 9/2010 | Bigliatti | F21V 5/00 362/235 |
| 2012/0113651 | A1 | 5/2012 | Kuo | |
| 2013/0314925 | A1* | 11/2013 | Jiang | F21V 5/04 362/311.02 |

FOREIGN PATENT DOCUMENTS

| | | | | |
|---|---|---|---|---|
| CN | 201836765 U | * | 5/2011 | ............. F21V 13/04 |
| DE | 102007054206 | | 4/2009 | |
| DE | 102008007723 | | 8/2009 | |
| DE | 102010041478 | | 3/2012 | |
| DE | 102011003300 | | 8/2012 | |
| EP | 1496488 | | 1/2005 | |
| WO | 03036159 | | 5/2003 | |

* cited by examiner

Preferably, the optical element is particularly suitably shaped such that, viewed in a cross section, to a first approximation it defines a trapezoidal shape, the flank areas being formed on the two limbs of the trapezoidal shape.

The arrangement is preferably configured in such a way that that proportion of the light which falls on the reflector is enlarged by the optical element. In this way it is possible that a particularly large proportion of the light falls on the reflector and can thus be deflected particularly suitably by the reflector. In particular, in this way an influence can be exerted particularly suitably specifically on a light distribution curve of the arrangement, which characterizes an angular dependency of the light output of the arrangement.

The reflector preferably has a reflective, structured surface region for influencing the light. In this way, a particularly specific, extensive light-deflecting influence on the light can be advantageously effected.

According to a further aspect of the invention, a system for light output is provided which comprises an arrangement for light output according to the invention, and at least one further arrangement for light output according to the invention, wherein the reflector of the first-named arrangement for light output and the corresponding at least one further reflector of the at least one further arrangement for light output are configured coherently, in particular in one piece.

The invention will be explained in more detail below by using an exemplary embodiment and with reference to the drawings, in which.

Figure 1:
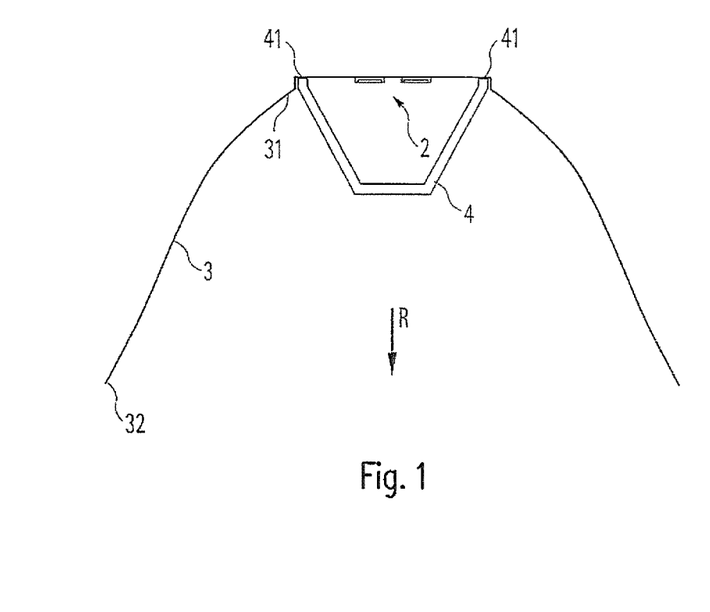
FIG. 1 shows a cross-sectional sketch relating to the principle of an arrangement for light output according to the invention.

FIG. 1 shows a cross-sectional sketch to explain the principle of an arrangement for light output according to the invention. The arrangement comprises an LED light source 2 for generating light and emitting the light in a main emission direction R. The LED light source 2 can have one LED or a plurality of LEDs, for example two LEDs as indicated in FIG. 1. Furthermore, the LED light source 2 can have an LED circuit board, on which the at least one LED of the LED light source 2 is arranged. The LED circuit board can in particular have a planar surface, on which the at least one LED is arranged.

The main emission direction R can in particular be a direction in which the LED light source 2 intrinsically outputs the most light. Of course, an LED or an LED light source typically outputs light not only in one direction but in a spatial angle, here therefore in a spatial angle around the main emission direction R. In particular, the configuration can be such that the main emission direction R extends at right angles to the surface of the LED circuit board and pointing away from the latter.

Furthermore, the arrangement comprises a reflector 3 for optically influencing the light.

Furthermore, the arrangement comprises an optical element 4 for optically influencing the light, wherein the optical element 4 is arranged so as to act between the LED light source 2, on the one hand, and the reflector 3, on the other hand.

The optical element 4 is configured such that it curves forward in the main emission direction R; it consists of a light-transmissive material. As a result of the forwardly curved shape of the optical element 4, it is possible for a particularly large proportion of the light which is emitted by the LED light source 2 to fall on the reflector 3. In this way, a particularly good utilization factor for the arrangement can be achieved.

The optical element 4 preferably consists of a clear, in particular glass-clear, material. In this way, a particularly large amount of light is able to pass through the optical element 4 and particularly little is lost by absorption. In particular, in this way, as compared with the prior art mentioned at the beginning, a reduction in the back-reflection rate can be achieved; it is therefore possible for the overall efficiency of the arrangement to be increased.

For example, PMMA or PC is particularly suitable as a material for the optical element 4. These two materials have a correspondingly suitable high level of transmission for light.

The reflector 3 preferably has a reflective area which is configured so as to extend in a converging manner between an opening 32 of the reflector 3, on the one hand, and a bottom area 31 of the reflector 3, on the other hand. The configuration is preferably such that the bottom area 31 of the reflector 3 adjoins the optical element 4, in particular adjoins directly.

The reflective area of the reflector 3 is preferably closed in the shape of a ring and in particular configured to be opaque.

The optical element 4 preferably has an annular rim 41, wherein the reflector 3 extends with its bottom area 31 on all sides as far as immediately by this rim 41 of the optical element 4.

Figure 2:
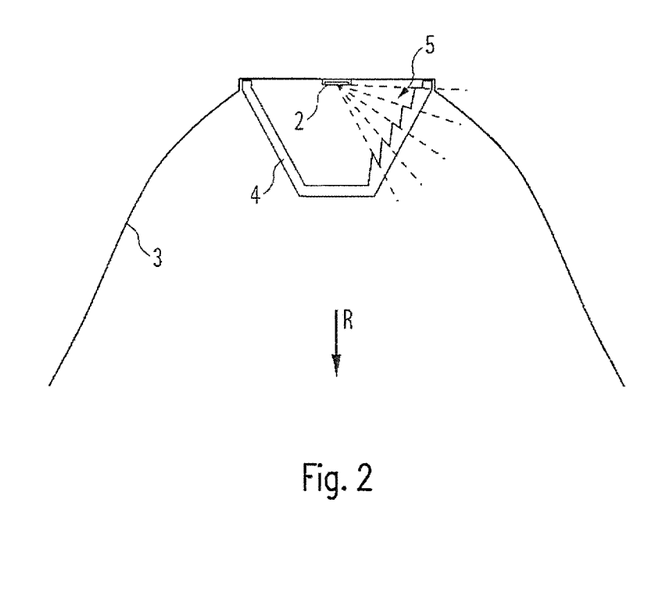
FIG. 2 shows a cross-sectional sketch relating to an exemplary embodiment.
Figure 3A:
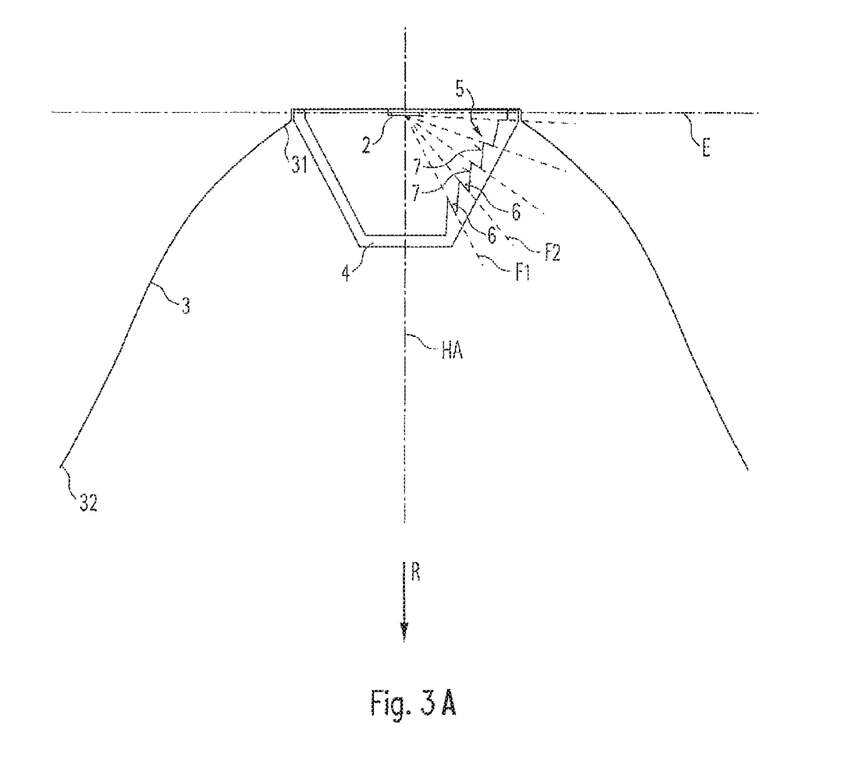
FIG. 3A shows a further, more detailed sketch relating to the exemplary embodiment.

FIG. 3A shows an enlarged and somewhat more extensive sketch of the exemplary embodiment shown in FIG. 2. The optical element 4 preferably extends as far as a plane E which is oriented normally with respect to the main emission direction R and passes through a light-emitting area of the LED light source 2. Particularly preferably, the optical element 4 extends on all sides as far as this plane E. For example, provision can be made for the rim 41 of the optical element 4 to extend annularly as far as this plane E or to intersect this plane E.

Preferably, the LED light source 2 defines an optical main axis HA, which, for example, passes through a center of a light-emitting area or, if appropriate, the light-emitting areas of the LED light source 2 and is oriented parallel to the main emission direction R. The optical element 4 is preferably shaped such that it extends around this main axis HA in the form of a hood or cup, in particular with a closed surface. For example, the optical element 4 can be shaped rotationally symmetrically in relation to the main axis HA. However, the optical element 4 can alternatively also be configured in such a way that it is rectangular in a section normal to the main axis HA.

The reflector 3 is also preferably shaped such that it extends around the main axis HA, for example rotationally symmetrically or rectangularly, corresponding to the optical element 4. In particular, provision can be made for the reflector 3 to extend as far as the plane E and to pass through or touch the latter, preferably annularly.

As indicated in FIG. 2, the optical element 4 can advantageously have a surface region with optical structures 5. By means of the optical structures 5, when the optical element 4 is viewed counter to the main emission direction R, it is possible for the LED source 2 no longer to be detectable as such, that is to say in particular a corresponding light point of an LED light or light points of LEDs belonging to the LED light source 2 to appear to be "dissolved". In particular, it is thus possible for a light-emitting area of the LED light source 2 no longer to be located as such.

The optical structures 5 can, for example, be linear structures, for example triangular in cross section. The structures 5—as indicated in FIG. 2—can be prism-like structures, they can be irregular or chaotic structures. Particularly suitably, the structures 5 are formed by linear structures which, for example, can be shaped triangularly in cross section. The structures 5 can also comprise cylindrical lenses or crossed cylindrical lenses. The latter are particularly suitable to cause the light points from the LED light source 2 to merge in one another.

By means of the structures 5—as compared with the prior art mentioned at the beginning, in which a diffuser disk is used—it is further possible for the back-reflection rate to be particularly reduced and, in this way, for the efficiency of the arrangement to be extensively improved.

Figure 3B:
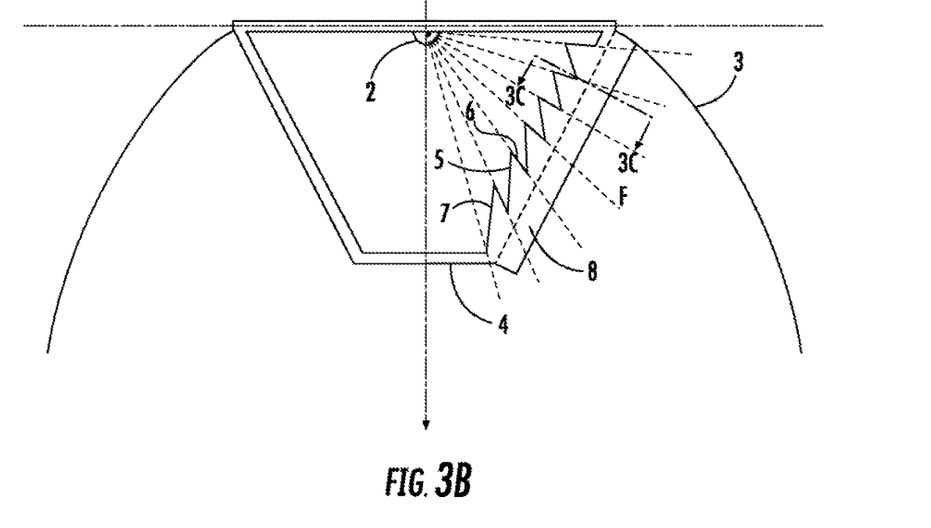
FIG. 3B shows a cross-sectional sketch of an alternative embodiment.
Figure 3C:
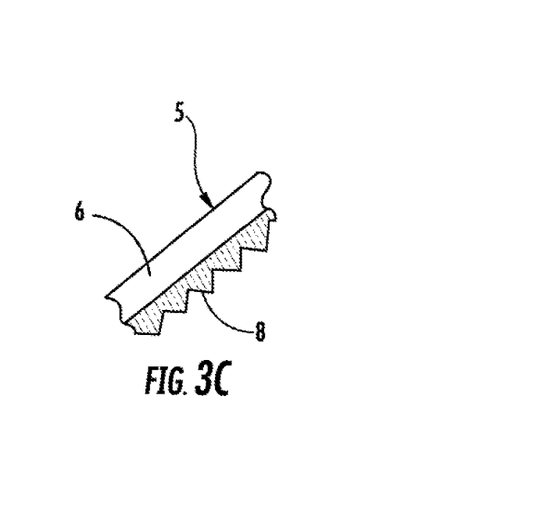
FIG. 3C shows a cross-section taken along line 3C-3C in FIG. 3B.

As indicated in FIGS. 2 and 3A, the surface region having the optical structures 5 can comprise a surface region of the optical element 4 that faces the LED light source 2. Alternatively or additionally, this surface region can also comprise a surface region of the optical element 4 that faces away from the LED light source 2 as shown in FIGS. 3B and 3C. In the last-named case, provision can be made, for example, for the outward facing structures 8 comprise linear structures which, on the surface region facing away from the LED light source 2, are formed and configured along a different direction than on the inward facing structures 5 facing the LED light source 2. In particular, these two linear structures can be configured so as to extend transversely with respect to each other. By means of this configuration, it is possible for the light to be scattered in two different directions; in this way, it is particularly advantageously possible to achieve the effect that, when the optical element 4 is viewed counter to the main emission direction R, the light points formed by the LED light source 2 merge into one another and thus a light-emitting area of the LED light source 2 can no longer be located as such.

As is the case in the example shown, the configuration is preferably such that by means of the, by means of the optical element 4, that proportion of the light which falls on the reflector 3 is increased. It is even possible to cause the light to fall on the reflector 3 completely.

Figure 4:
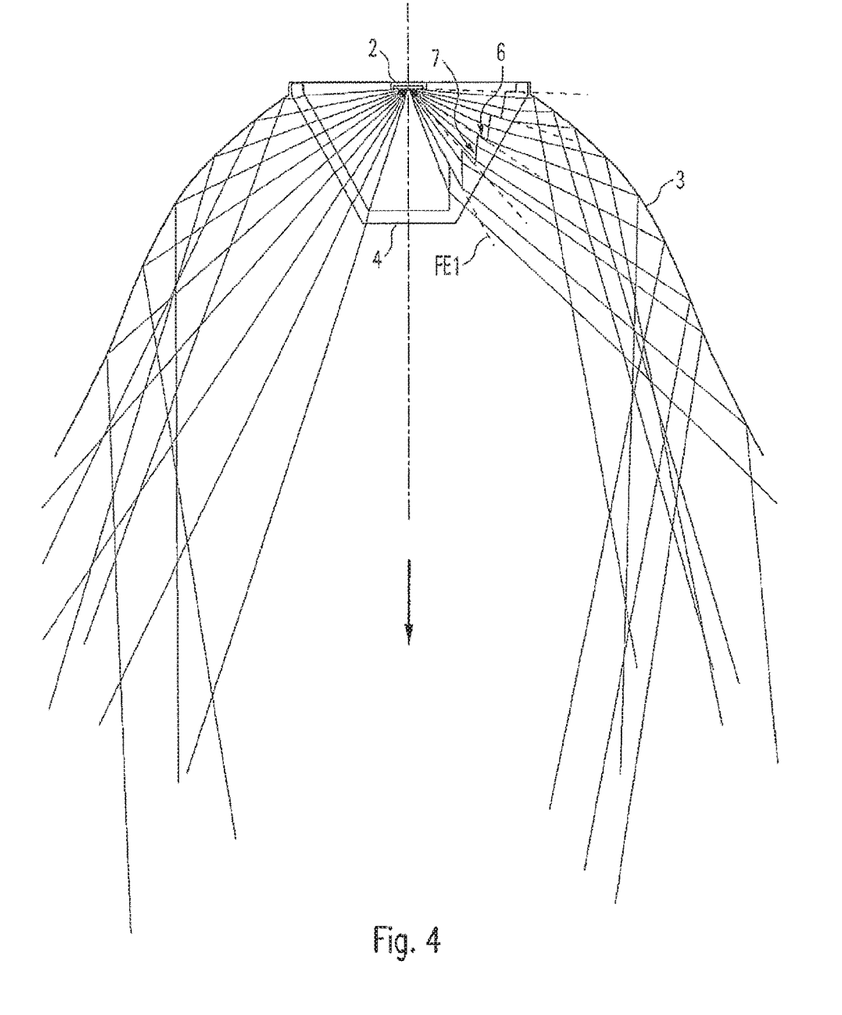
FIG. 4 shows a sketch relating to the beam path of the light.

This is shown by way of example in FIG. 4 by using exemplary light beams, specifically—with reference to the sketch of FIG. 4—on the right-hand side of the LED light source 2 for the case of appropriate structures 5 formed on the inner side of the optical element 4 and, on the left-hand side—for comparison—for the case in which the optical element 4 has no corresponding structures.

As the light beams show, the structures 5 act in such a way that more light beams fall on the reflector 3, that is to say a larger proportion of the light falls on the reflector 3. In this way, it is possible for the action of the reflector 3 to be intensified. By comparison thereto, in the case of a correspondingly unstructured optical element 4—as sketched on the left in FIG. 4—a greater proportion of the light emitted by the LED light source 2 is output to the outside directly via the opening 32 of the reflector 3, that is to say without prior reflection at the reflector 3.

For this purpose, the structures 5 can advantageously have flank areas 6—in particular on the surface region facing the LED light source 2—which can also be designated as "interfering flanks" and which are shaped in such a way that they generate as little undesired scattered light as possible. For this purpose, the interfering flanks 6 can preferably each extend in a flank plane F1, F2 which passes through the LED light source 2 or passes through the point of intersection of the main axis HA with the plane E. By means of this configuration of the interfering flanks 6, it is possible for particularly little of the light that is emitted by the LED light source 2 to fall on said flanks.

Alternatively, the interfering flanks 6 can be shaped such that they each extend along a surface of a cone, the tip of which passes through the LED light source 2. The same effect can be achieved in this way.

A formation of the interfering flanks 6 along the flank planes F1, F2 is particularly suitable when the optical element 4 and the reflective area of the reflector 3 are configured rectangularly in a section normal to the main axis HA; a corresponding formation along conical surfaces, on the other hand, when the optical element 4 and the reflective area of the reflector 3 are configured circularly in a section normal to the main axis HA.

Between the interfering flanks 6, it is possible for "active flanks" 7 to be formed, which can be formed and oriented in such a way that they deflect the light striking the same onto the reflective area of the reflector 3. In particular, by means of configuring the shapes and orientations of the active flanks 7, it is possible to determine what proportion of the light is deflected onto the reflector 3 and what proportion of the light is deflected past the reflector 3—therefore directly through the opening 32 of the reflector 3. In this way, an influence can be exerted on a light distribution curve, which characterizes the light output of the arrangement as a function of angle, and thus an influence can be exerted on the lighting properties of the arrangement, such as in particular the glare behavior, achievable luminous intensity, etc.

As is the case in the example shown, the optical element 4 can advantageously be shaped such that, viewed in a cross section, in particular in a cross section along the main axis HA, to a first approximation it defines a trapezoidal shape, the interfering flanks 6 and the active flanks 7 being formed on the two limbs of the trapezium.

However, the optical element 4 does not have to be configured—as shown—in the form of a truncated cone to a first approximation. It can, for example, also have the shape of a pyramid tapering to a point or a dished shape. In any case, the fact that the optical element 4 curves forward in the main emission direction R provides better possibilities of influencing the light output in a desired way.

The structures 5 are preferably designed in such a way that they permit a suitable production method for the optical element 4 (for example deformable, extrudable, etc.).

If the reflector 3 or the reflective area of the same has a reflective, structured surface region (not shown in the figures) for influencing the light, the light can be deflected extensively particularly specifically and thus, in particular, the light distribution curve can be extensively influenced. The lighting quality of the arrangement can be increased further hereby. The structured surface region of the reflector 3 can, for example, comprise cylindrical and/or spherical and/or facet-like structures.

Figure 5:
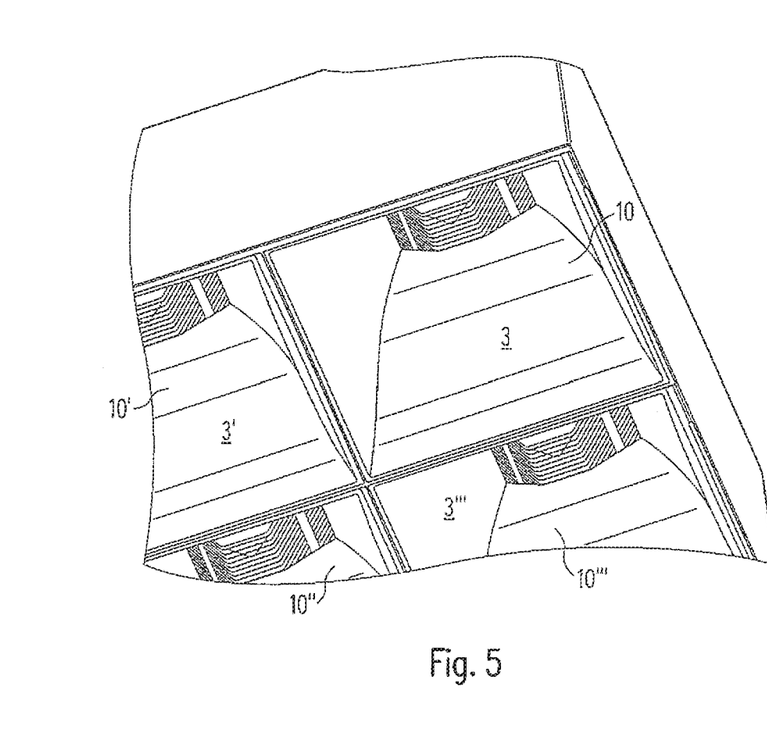
FIG. 5 shows a perspective view of a system comprising a plurality of arrangements for light output.
Figure 6:
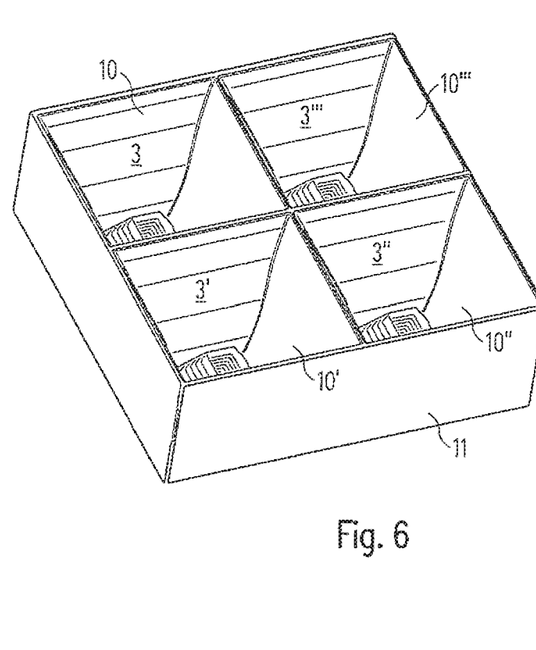
FIG. 6 shows a perspective sketch of said system from another viewing direction.
Figure 7:
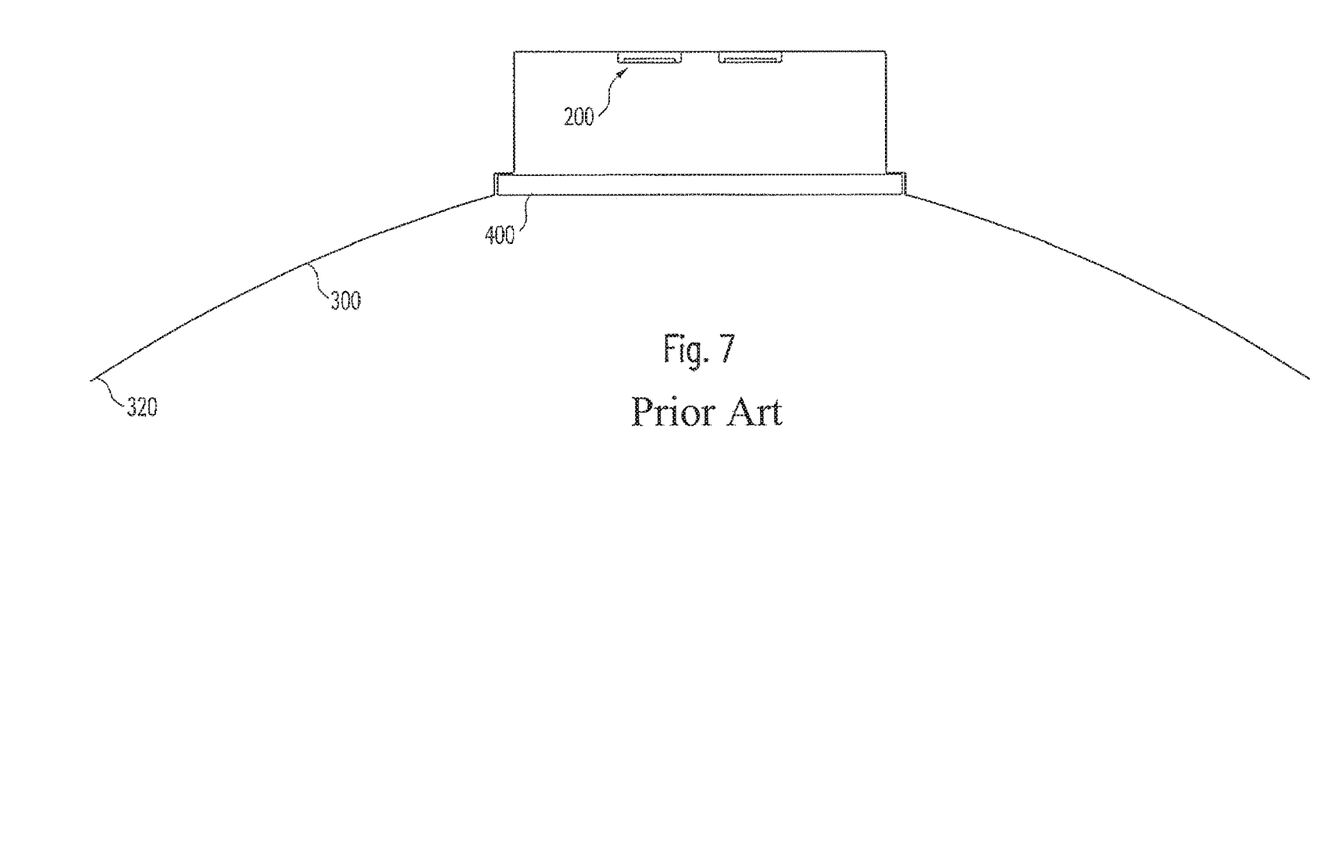
FIG. 7 shows a sketch relating to a corresponding arrangement for light output according to the prior art.

As indicated perspectively in FIGS. 5 and 6, a system for light output can also be provided which comprises a corresponding arrangement for light output 10 and at least one further corresponding arrangement for light output 10', 10", 10"', wherein the reflector 3 of the first-named arrangement for light output 10 and the corresponding at least one further reflector 3', 3", 3"' of the at least one further arrangement for light output 10', 10", 10"' are configured coherently, in particular in one piece. The system preferably also has a housing 11, which surrounds the arrangements 10, 10', 10", 10"' in a protective manner.

In the example shown, the arrangements 10, 10', 10", 10"' of the system are each implemented identically. As emerges from the perspective illustration, in the arrangements both the optical element 4 and the reflector 3, viewed in a section normal to the main axis HA, have a rectangular cross section.

As is the case in the prior art as such mentioned at the beginning, said system can also be configured as a pot-grid array.

The system is suitable not only for forming a "flat" or matrix-form cellular grid—as indicated in FIGS. 5 and 6—but also for forming correspondingly linearly configured systems. In more general terms, the system can, for example, be shaped rotationally symmetrically or linearly or squarely or rectangularly or polygonally.

By using an arrangement according to the invention or a system according to the invention for light output, in particular in comparison with the prior art mentioned at the beginning, absorption losses can be reduced. The utilization factor can be increased by the "elevated" optical element 4 curved forward in the main emission direction R. Advantages of conventional grid optics, such as very good glare prevention, reduced viewing angle directly into the light source, dark light louver, etc., can be maintained.

The invention claimed is:

1. An arrangement for light output, comprising:
   an LED light source for generating light and emitting the light in a main emission direction,
   a reflector for optically influencing the light, and
   an optical element for optically influencing the light, the optical element being arranged to act between the LED light source, and the reflector,
   wherein the optical element is configured in a manner extending forward in the main emission direction and formed of a light-transmissive material, and having a surface region with a plurality of spaced apart optical structures formed thereon,
   wherein the plurality of optical structures are prism-like structures each having a flank area which;
      lies in a flank plane, with each of the flank planes passing through the LED light source, or
      extending along a surface of a cone, with a tip of each cone terminating at the LED light source.

2. The arrangement as claimed in claim 1, in which the optical element consists of a clear material.

3. The arrangement as claimed in claim 1, in which the optical element extends, as far as a plane which is oriented normally with respect to the main emission direction and passes through a light-emitting area of the LED light source.

4. The arrangement as claimed in claim 1, in which the reflector has a reflective area which is configured so as to extend in a converging manner between an opening of the reflector, and a bottom area of the reflector, the bottom area of the reflector adjoining the optical element.

5. The arrangement as claimed in claim 1, wherein the surface region having the optical structures comprises a surface region of the optical element that faces the LED light source.

6. The arrangement as claimed in claim 5, in which the structures comprise linear structures which, on the inward surface region facing the LED light source, are formed and configured to extend in a transverse direction relative to outward linear structures on the surface region of the optical element that faces away from the LED light source.

7. The arrangement as claimed in claim 1, in which the structures are configured in such a way that, when the optical element is viewed counter to the main emission direction, a light-emitting area of the LED light source does not directly emit light toward the viewer.

8. The arrangement as claimed in claim 1, in which the optical element is shaped such that, viewed in a cross section, the optical element defines a trapezoidal shape, the flank areas being formed on at least one side of the trapezoidal shape.

9. The arrangement as claimed in claim 1, which is configured in such a way that the proportion of the light which falls on the reflector is enlarged by the optical element.

10. The arrangement as claimed in claim 1, in which the reflector has a reflective, structured surface region for influencing the light.

11. A system for light output, comprising:
    an arrangement for light output as claimed in claim 1, and
    at least one further arrangement for light output as claimed in claim 1, wherein the reflector of the first-named arrangement for light output and the corresponding at least one further reflector of the at least one further arrangement for light output are configured in one piece.

12. An arrangement for light output, comprising:
    an LED light source for generating light and emitting the light in a main emission direction,
    a reflector for optically influencing the light, and
    an optical element for optically influencing the light, the optical element being arranged so as to act between the LED light source, and the reflector,
    wherein the optical element being configured in a manner extending forward in the main emission direction and formed of a light-transmissive material having an inward surface region with spaced apart linear inward facing optical structures,
    wherein the inward facing optical structures have flank areas which each extend in a flank plane, with the flank planes passing through the LED light source, and
    wherein the optical element further has an outward facing surface region with spaced apart linear outward facing optical structures which are oriented in a different direction than inward facing optical structures.

* * * * *

UNITED STATES PATENT AND TRADEMARK OFFICE
CERTIFICATE OF CORRECTION

PATENT NO. : 9,863,606 B2
APPLICATION NO. : 14/786894
DATED : January 9, 2018
INVENTOR(S) : Stephan Ebner et al.

It is certified that error appears in the above-identified patent and that said Letters Patent is hereby corrected as shown below:

On the Title Page

Delete:
"(73) Assignee: ZUMTOBEL LIHTING GMBH"
And insert:
-- (73) Assignee: ZUMTOBEL LIGHTING GMBH --

Signed and Sealed this
Twenty-fourth Day of April, 2018

Andrei Iancu
*Director of the United States Patent and Trademark Office*